US006231759B1

(12) United States Patent
Sato

(10) Patent No.: US 6,231,759 B1
(45) Date of Patent: May 15, 2001

(54) WATER TREATMENT DEVICE

(76) Inventor: Takashi Sato, 595-1 Taguchi-machi, Maebashi-shi, Gunma (JP)

( * ) Notice: Subject to any disclaimer, the term of this patent is extended or adjusted under 35 U.S.C. 154(b) by 0 days.

(21) Appl. No.: 09/191,619

(22) Filed: Nov. 13, 1998

(30) Foreign Application Priority Data

Dec. 24, 1996 (JP) ...................................................... 3-55642

(51) Int. Cl.$^7$ ...................................................... C02F 1/48
(52) U.S. Cl. ........................... 210/222; 210/695; 123/536; 123/538; 335/303
(58) Field of Search .................... 210/222, 695; 123/536, 538; 335/303

(56) References Cited

U.S. PATENT DOCUMENTS 3,402,820 * 9/1968 Lohmann .............................. 210/222
5,536,401 * 7/1996 Burns ................................... 210/222

* cited by examiner

*Primary Examiner*—David A. Reifsnyder
(74) *Attorney, Agent, or Firm*—Darby & Darby

(57) ABSTRACT

There is disclosed a water treatment device which can be easily attached to a water distributing pipe in a general household water meter box without using any special tool. The device comprises a pair of magnetic bodies in which adjacent permanent magnets are arranged with different polarities. The magnetic bodies are housed in housing sections, and biased toward openings of housings by coil springs. The device also comprises a first connecting portion provided on one side for rotatably and detachably connecting both housings while the openings of the housings are opposed to each other, and a second connecting portion provided on the other side for detachably connecting both housings while the openings of the housings are opposed to each other. The water distributing pipe is held between the permanent magnets when both housings are connected.

6 Claims, 5 Drawing Sheets

WATER TREATMENT DEVICE

BACKGROUND OF THE INVENTION

The present invention relates to a water treatment device which is attached to a city water distributing pipe to prevent the generation of rust, slimes and scales in the pipe and to improve the quality of city water.

A large-scale water treatment device using electromagnets or permanent magnets has been heretofore installed in a factory or the like to purify the inside of a pipe and improve the water quality. It is known that the inside of the pipe is purified by forming a magnetic field in the pipe using magnets and the water quality can be improved by passing water through the magnetic field.

For the above-mentioned large-scale water treatment device, since the installation expense is high and the installation work is difficult, such device has not been installed in a small-scale factory or a general household. Recently, a small-size water treatment device has been developed using permanent magnets, rather than the large-scale water treatment device.

However, when the water treatment device is installed in the small-scale factory or the general household, it is difficult to perform installation work. Moreover, water distributing pipes have various outer diameters. In a case where the water treatment device is attached to the water distributing pipe, if permanent magnets are arranged apart from one another in the pipe, the magnetic field is weakened, so that the effect of the water treatment device cannot be sufficiently fulfilled. This causes a problem that a plurality of water treatment devices have to be prepared corresponding to water distributing pipes with different outer diameters.

Furthermore, if the water treatment device is reduced in size, no large magnetic field can be obtained, so that the effect of purifying the water distributing pipe or improving the water quality in the water distributing pipe cannot be sufficiently fulfilled. To solve the problem, the enlargement of the water treatment device cannot be avoided. Additionally, when the water treatment device is installed in the water distributing pipe, attachment work has to be performed.

SUMMARY OF THE INVENTION

The present invention has been developed to solve the prior-art problems, and an object thereof is to provide a water treatment device which can easily be attached to a water distributing pipe in a water meter box for a general household without using any special tool.

To attain this and other objects, the present invention provides a water treatment device which comprises a pair of housings containing magnetic bodies consisting of permanent magnets and having the magnetic bodies exposed in openings, a first connecting portion provided one side of the housings for rotatably and detachably connecting the housings while the openings are opposed to each other, and a second connecting portion provided on the other side of the housings. While the housings are connected by the first connecting portion, a water distributing pipe is held between the magnetic bodies, and the housings are detachably connected by the second connecting portion.

DETAILED DESCRIPTION OF THE PREFERRED EMBODIMENT

The water treatment device of the present invention comprises a pair of housings containing magnetic bodies consisting of permanent magnets and having the magnetic bodies exposed to openings, first connecting portions provided one sides of the housings for rotatably and detachably connecting the housings while the openings are opposed to each other, and second connecting portions provided on the other sides of the housings. In the water treatment device, while both housings are connected by the first connecting portions, a water distributing pipe is held between the permanent magnets and both housings are detachably connected by the second connecting portions. In the structure, after the other housing is installed beforehand, the first connecting portion of the housing is connected to the first connecting portion provided on the other housing. After the water distributing pipe is held between the magnetic bodies, the second connecting portions can be connected to each other. Therefore, neither special tool nor attachment work is necessary for the attachment of the water treatment device. Therefore, the water treatment device can be remarkably easily attached even in the small-scale factory or the general household.

Figure 1:
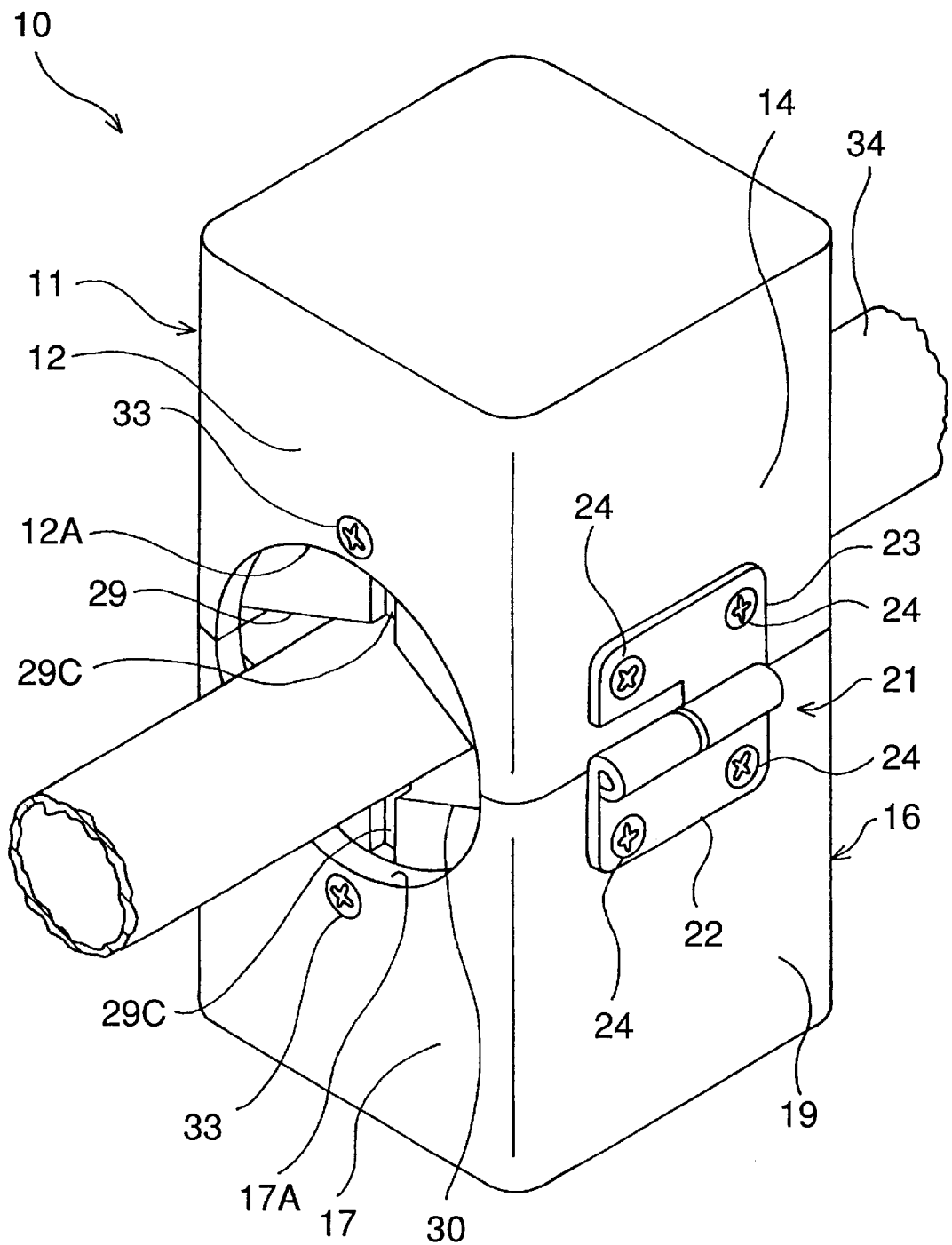
FIG. 1 is a perspective view of a water treatment device of the present invention attached to a water distributing pipe.
Figure 2:
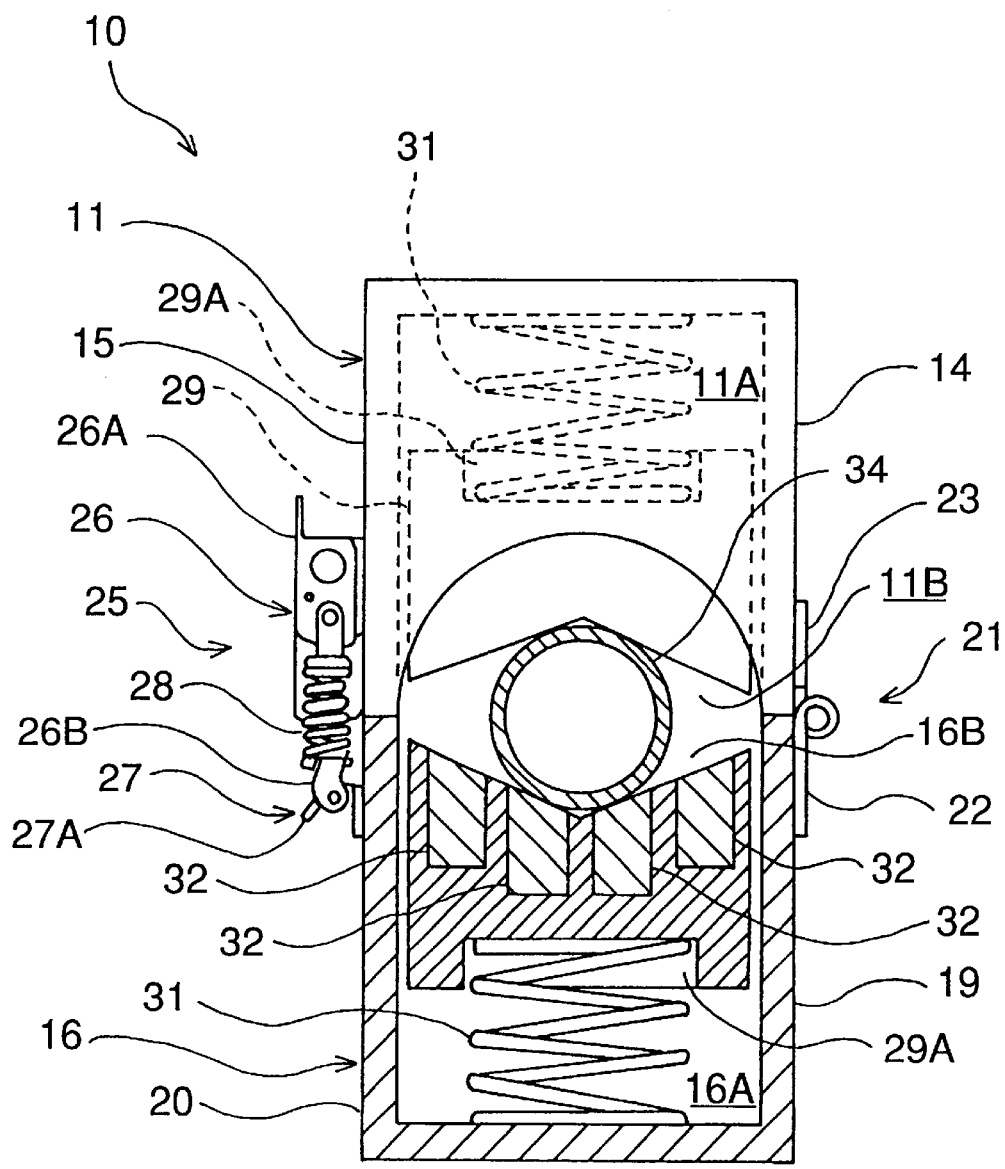
FIG. 2 is a partial longitudinal side view of the water treatment device of the present invention attached to the water distributing pipe.
Figure 3:
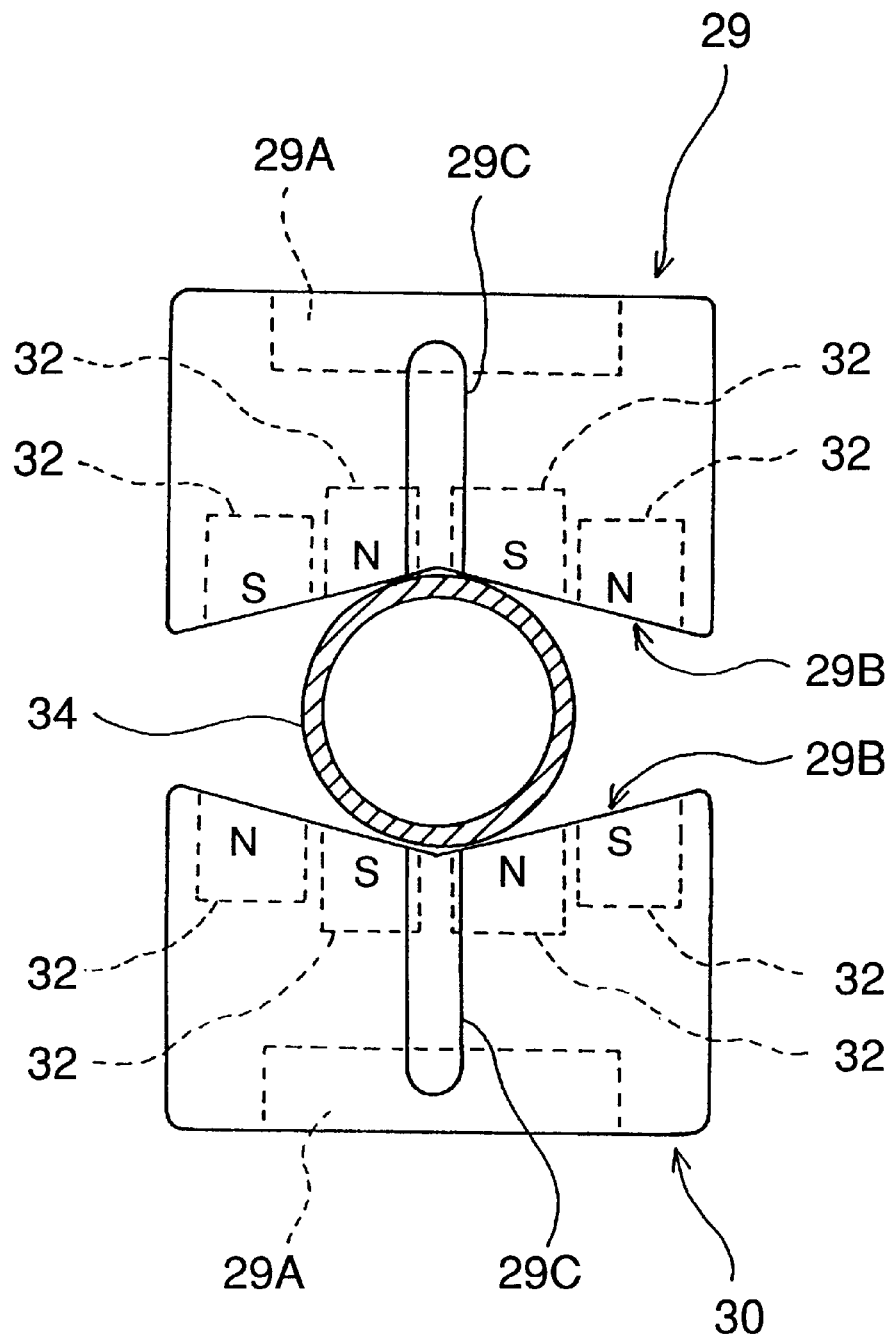
FIG. 3 is a side view of magnetic bodies showing the arrangement of permanent magnets in the water treatment device of the present invention attached to the water distributing pipe.
Figure 4:
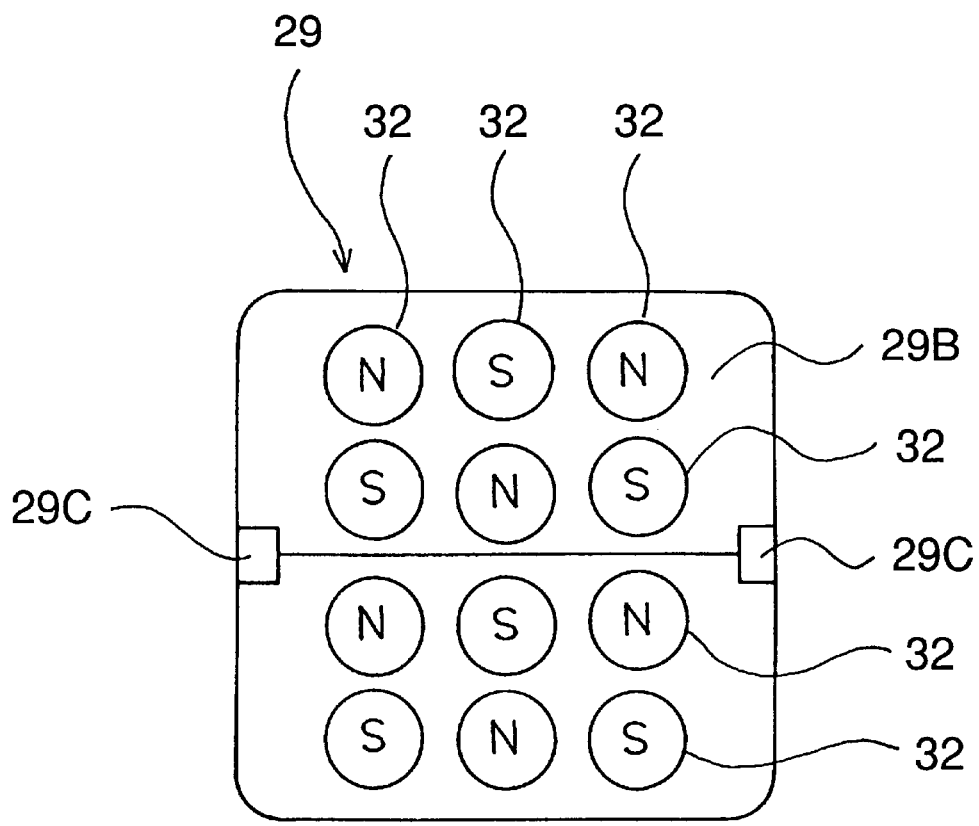
FIG. 4 is a plan view of the magnetic body showing the arrangement and polarities of the permanent magnets in the water treatment device of the present invention.
Figure 5:
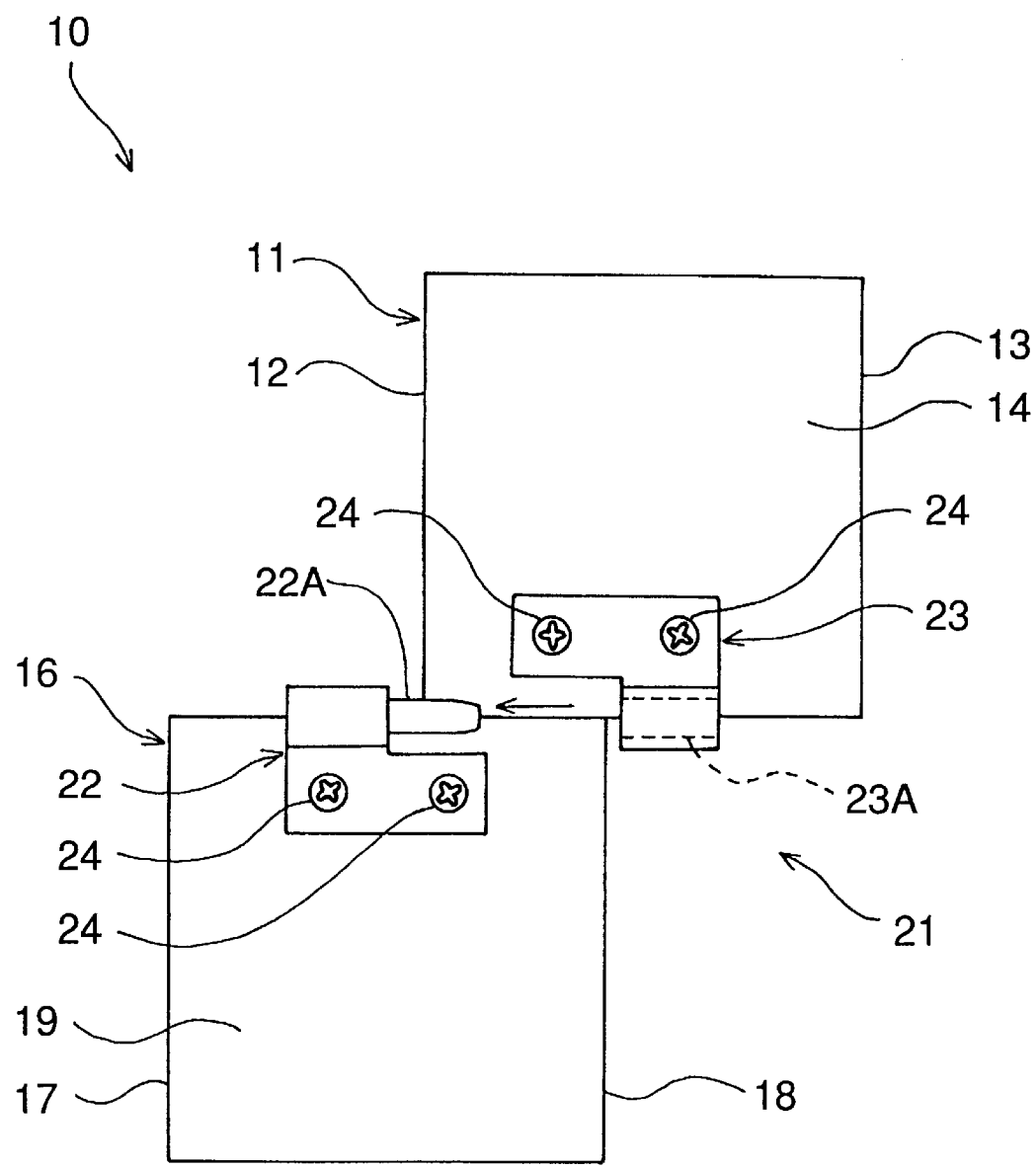
FIG. 5 is a side view showing the attachment state of both housings of the water treatment device of the present invention.

The embodiment of the present invention will be described hereinafter using FIGS. 1 to 5.

A water treatment device 10 is provided for purifying a water distributing pipe 34 and improving water quality in the water distributing pipe 34, and comprises a pair of housings 11, 16 constituting housing sections 11A, 16A and a pair of magnetic bodies 29, 30. The housing 11 is formed of stainless or another metal that will not easily rust, and has a substantially rectangular shape with an opening 11B on one end, in which the housing section 11A is formed. Side walls 14, 15 are provided on opposite sides of the housing section 11A. A front wall 12 and a back wall 13 are disposed on front and back edges between the side walls 14 and 15. A front notch 12A is formed in the front wall 12 by cutting the front wall into a predetermined size from the edge of the opening 11B, while a back notch (not shown) is formed in the back wall 13. The front notch 12A and the back notch are formed into semicircular shapes slightly larger than the water distributing pipe with a predetermined thickness.

The other housing 16 is also constituted of stainless or another metal that will not easily rust in the same manner as the housing 11.

Specifically, the housing 16 comprises a housing section 16A formed in an opening 16B and side walls 19, 20 formed on opposite sides of the housing section 16A. A front wall 17 and a back wall 18 are disposed on front and back edges between the side walls 19 and 20. Moreover, a front notch 17A is formed in the front wall 17 by cutting the front wall into a predetermined size from the edge of the opening 16B, while a back notch (not shown) is formed in the back wall 18. The front notch 17A and the back notch are formed into semicircular shapes slightly larger than the water distributing pipe larger than the other water distributing pipes. In this case, when the front notch 12A and the back notch of the housing 11 are aligned with the front notch 17A and the back notch of the housing 16, the predetermined circular shapes are formed, via which the water distributing pipe 34 having the predetermined thickness can be inserted between both housings 11 and 16.

A first connecting portion 21 is attached to the side walls 14, 19 on one side of both housings 11, 16. The first connecting portion 21 is provided with an inserting member 22 and a receiving member 23. The receiving member 23 is fixed to the side of opening 11B in the substantial center of the side wall 14 of the housing 11 via predetermined screws 24, while the inserting member 22 is fixed to the side of opening 16B in the substantial center of the side wall 19 of the other housing 16 via the screws 24. The inserting member 22 is provided with an inserting pin 22A, and the receiving member 23 is provided with a receiving hole 23A. For the inserting pin 22A and the receiving hole 23A, when the openings 11B, 16B of both housings 11, 16 are aligned with each other, the inserting pin 22A can easily be inserted to the receiving hole 23A.

Moreover, a second connecting portion 25 is attached to the side walls 19, 20 on the other side of both housings 11, 16. The second connecting portion 25 is provided with an operating member 26 and a fixing member 27. The operating member 26 is fixed to the side of opening 11B in the substantial center of the side wall 15 of the housing 11 via screws (not shown), while the fixing member 27 is fixed to the side of opening 16B in the substantial center of the side wall 20 of the other housing 16 via screws (not shown). The operating member 26 is provided with an operating lever 26A having a hook metal 26B on the side of opening 11B of the housing 11, and the fixing member 27 is provided with a fixing metal 27A protruded from the side wall 20. The fixing metal 27A is constituted in such a manner that the hook metal 26B of the operating member 26 can easily be hooked.

Specifically, the housing 11 can be detachably attached to the other housing 16 by the receiving member 23 of the first connecting portion 21 on the housing 11 and the inserting member 22 on the housing 16. Furthermore, while both housings 11, 16 are connected via the first connecting portion 21, the other housing 16 (or the housing 11) can be rotatably connected to the housing 11 (or the housing 16) by the first connecting portion 21.

When the inserting pin 22A is inserted to the receiving hole 23A to match the openings 11B, 16B of both housings 11, 16, the hook metal 26B of the operating member 26 is hooked on the fixing metal 27A of the fixing member 27. Additionally, the operating lever 26A is operated to connect the second connecting portion 25, so that both housings 11, 16 are integrally connected. The second connecting portion 25 is also provided with a spring 28. Additionally, screws 33 are provided to prevent both magnetic bodies 29, 30 described later from protruding further from the openings 11B, 16B. The screws 33 are attached to both front walls 12, 17 and both back walls 13, 18, and ends of the screws 33 are slightly protruded to the housing sections 11A, 16A.

On the other hand, the magnetic body 29 can be contained in the housing section 11A formed in the housing 11. While the magnetic body 29 is inserted in the housing section 11A, the magnetic body 29 can move inside the housing section 11A. Furthermore, while the magnetic body 29 is housed in the housing section 11A, an abutting portion 29B is formed in a V-shape concave in the center of the side of opening 11B of the housing 11. The magnetic body 29 also has a concave portion 29A formed on the side opposite to the abutting portion 29B, and a coil spring 31 is inserted to the concave portion 29A. The magnetic body 29 is constantly biased toward the opening 11B of the housing 11 by the coil spring 31.

A plurality of permanent magnets 32 are arranged on the plane of the abutting portion 29B of the magnetic body 29, while the permanent magnets are arranged with predetermined intervals (four magnets in the lengthwise direction and three magnets in the crosswise direction) on the abutting portion 29B. The permanent magnets 32 with different polarities (N-polarity, S-polarity) are alternately arranged and attached. The magnetic body 29 has grooves 29C, 29C each having a predetermined depth in its front and back faces. The grooves 29C, 29C are extended to the abutting portion 29B with a small allowable interval from the end of the side of concave portion 29A of the magnetic body 29. The ends of the screws 33 provided on the front and back walls 12, 13 are protruded to both grooves 29C, 29C. In the structure, the abutting portion 29B of the magnetic body 29 biased by the coil spring 31 is prevented from protruding from the opening 11B of the opening 11.

In the other housing 16, the magnetic body 30 is provided in the same manner as the magnetic body 29 in the housing 11. In this case, a plurality of permanent magnets 32 are arranged in the magnetic body 30 with the polarities reverse to the polarities of the permanent magnets 32 arranged in the magnetic body 29. The other structure of the magnetic body 30 is the same as that of the magnetic body 29, and the description thereof is omitted. Specifically, the magnetic bodies 29 and 30 are contained in the housing sections 11A, 16A of both housings 11, 16, respectively. The magnetic bodies 29, 30 are exposed to the openings 11B, 16B of both housings 11, 16.

While the housing 11 is connected to the other housing 16, a plurality of permanent magnets 32 in the housing 11 and a plurality of permanent magnets 32 in the housing 16 are arranged to attract one another. In this case, an alternating field is formed in a plurality of permanent magnets 32 arranged on the abutting portion 29B of the magnetic body 29. Therefore, magnetic fields of the permanent magnets 32 arranged in the magnetic bodies 29 and 30 are strengthened. Since it is heretofore known that the formation of the alternating field forms a strong magnetic field, the description is omitted.

The operation of the water treatment device 10 having the structure described above will now be described. Additionally, the water treatment device 10 is formed of stainless or another metal that will not easily rust. When the water treatment device 10 is attached, for example, to the water distributing pipe 34 for a general household, the other housing 16 is inserted to the water distributing pipe 34 in a water meter box (not shown) in such a manner that the abutting portion 29B of the magnetic body 30 abuts on the water distributing pipe 34 from below. Subsequently, the inserting pin 22A of the inserting member 22 on the side wall 19 of the other housing 16 is inserted into the receiving hole 23A of the receiving member 23 on the side wall 14 of the housing 11 (as shown by an arrow of FIG. 5). Then, both housings 11, 16 are rotatably connected via the first connecting portion 21.

Subsequently, the housing 11 is rotated to match the opening 11B, and the hook metal 26B of the operating member 26 provided on the housing 11 is hooked on the fixing metal 27A of the fixing member 27 provided on the other housing 16. At this time, since both magnetic bodies 29, 30 are constantly biased toward the openings 11B, 16B by the coil springs 31, 31, the abutting portions 29B, 29B of both magnetic bodies 29, 30 are easily allowed to closely abut on the outer diameter of the water distributing pipe 34.

Subsequently, the operating lever 26A is operated to fix the operating member 26 and the fixing member 27. Thereby, both housings 11, 16 are connected by the first and second connecting portions 21 and 25, and the water treatment device 10 is attached to the water distributing pipe 34. For the water distributing pipe 34 having a small diameter, since both magnetic bodies 29, 30 of the water treatment device 10 are biased toward the openings 11B, 16B by the coil springs 31, 31, the abutting portions 29B, 29B of both magnetic bodies 29, 30 are easily allowed to closely abut on the water distributing pipe 34.

Moreover, for the water treatment device 10 attached to the water distributing pipe 34, an alternating field is formed in the water distributing pipe 34 by both magnetic bodies 29, 30 provided inside both housings 11, 16. In this case, the permanent magnets 32 of the magnetic body 29 and the opposed permanent magnets 32 of the other magnetic body 30 attract one another. Thereby, the alternating field can be formed in the water distributing pipe 34, so that the purification and water-quality improvement inside the water distributing pipe 34 can be performed.

As aforementioned, while the openings 11B, 16B of both housings 11, 16 are opposed and matched, the first connecting portion 21 is provided on one side of both housings 11, 16, and the second connecting portion 25 is provided on the other side. Therefore, the water distributing pipe 34 can be held between the permanent magnets 32 with both housings 11, 16 being connected by the first connecting portion 21. Moreover, while the water distributing pipe 34 is held between the permanent magnets 32 of both housings 11 and 16, both housings 11, 16 are detachably connected via the second connecting portion 25. Therefore, when the water treatment device 10 is mounted, neither special tool nor attachment work is necessary. This enables the water treatment device 10 to be remarkably easily attached to the water distributing pipe 34.

Furthermore, both magnetic bodies 29, 30 are movably contained in the housing sections 11A, 16A, and the coil springs 31, 31 are interposed between both magnetic bodies 29, 30 and the housing sections 11A, 16A, so that both magnetic bodies 29, 30 can be constantly biased toward the openings 11B, 16B of the housings 11, 16. Therefore, even if the outer diameter of the water distributing pipe 34 differs, both magnetic bodes 29, 30 can easily abut on the water distributing pipe 34.

Moreover, in both magnetic bodies 29, 30, a plurality of adjoining permanent magnets 32 with different polarities are arranged in the housing sections 11A, 16A. Additionally, while the water distributing pipe 34 is held between the magnetic bodies 29, 30, the opposed permanent magnets 32 are different from each other in polarity. In the structure, since the alternating field is formed between both magnetic bodies 29, 30, a strong magnetic filed can be formed in the water distributing pipe 34. Consequently, even if the water treatment device 10 is reduced in size, the strong magnetic field can be maintained, and a sufficient effect of the water treatment device 10 can be achieved.

Additionally, in the embodiment, both magnetic bodies 29, 30 are movably constituted by disposing the coil springs 31 in both housings 11, 16. The invention is not limited to this embodiment, and only one of the magnetic body 29 and the magnetic body 30 may be movably constituted by disposing the coil spring 31 in either the housing 11 or the housing 16.

As aforementioned, in the structure according to the present invention, the water treatment device comprises a pair of housings containing magnetic bodies constituted of permanent magnets and having the magnetic bodies exposed in openings, first connecting portions provided on one sides of the housings for rotatably and detachably connecting both housings while the openings are opposed to each other, and second connecting portions provided on the other sides of both housings. While both housings are connected via the first connecting portion, a water distributing pipe is held between the permanent magnets. In the condition, both housings are detachably connected by the second connecting portion. Therefore, after the other housing is installed beforehand, the first connecting portion of the housing is connected to the first connecting portion of the other housing. After inserting the water distributing pipe between the magnetic bodies, the second connecting portions can be connected. This obviates the necessity of a special tool or attachment work for the attachment of the water treatment device. Therefore, the water treatment device can be remarkably easily mounted even in a small-scale factory or a general household.

The device also comprises housing sections containing magnetic bodies constituted of permanent magnets and forming a pair. The water distributing pipe is held between the magnetic bodies. At least one magnetic body is movably housed in the housing section, and a spring member is interposed between the magnetic body and the housing section. Therefore, the magnetic body can be constantly biased toward the water distributing pipe. In the structure, the permanent magnets of both magnetic bodies are securely allowed to abut on the water distributing pipe. Even if the thickness of the water distributing pipe differs, both magnetic bodies are securely allowed to abut on the water distributing pipe. Therefore, a plurality of water treatment devices are not needed to be prepared corresponding to water distributing pipes having different thickness sizes, and the cost of the water treatment device can remarkably be reduced.

The device further comprises a pair of magnetic bodies constituted of a plurality of permanent magnets and having adjacent permanent magnets different from each other in polarity. While the water distributing pipe is held between the magnetic bodies, the permanent magnets opposed in the condition are different from each other in polarity. Therefore, an alternating field is formed between the opposed magnetic bodies. In the structure, since a strong magnetic field can be formed between both magnetic bodies, a strong magnetic field can be maintained even if the water treatment device is made small. The water treatment device can remarkably be miniaturized. Therefore, the water treatment device can be attached inside a narrow box of water meter attached to the water distributing pipe.

What is claimed is:

1. A water treatment device for water flowing in a pipe comprising:

first and second bodies each having a plurality of permanent magnets mounted therein, each said magnet in a body having a portion of one of two opposite magnetic polarities;

first and second housing sections within which said first and second bodies are respectively mounted;

a first connecting portion on one side of each of said housing sections for pivotably and detachably connecting said housing sections to have the magnets of the two bodies opposed to each other on opposite sides of the pipe;

said plurality of permanent magnets being positioned in each body such that when said bodies are placed opposite each other by said connecting portion, with the pipe therebetween, the portion of a magnet of one body having one magnetic polarity opposes the portion of a magnet of the other body having the opposite magnetic polarity; and means in each housing section for resiliently biasing the body therein in a direction to bring the plurality of magnets thereof closer to the pipe.

2. A water treatment device as in claim 1 wherein the plurality of magnets of each said body are arrayed with a magnet having a said portion of one magnetic polarity being adjacent to a magnet having its said portion of the opposite magnetic polarity.

3. A water treatment device as in claim 2 wherein said plurality of magnets of each body are arrayed in a plurality of rows.

4. A water treatment device as in claim 1 further comprising:

a locking type second connecting portion on another side of each of said housing sections to hold the housings together while connected by said first connecting portions with the pipe held between said magnetic bodies.

5. A water treatment device as in claim 4 wherein the plurality of magnets of each said body are arrayed with a magnet having a said portion of one magnetic polarity being adjacent to a magnet having its said portion of the opposite magnetic polarity.

6. A water treatment device as in claim 1 wherein said resilient biasing means comprises a coil spring.

* * * * *

UNITED STATES PATENT AND TRADEMARK OFFICE
CERTIFICATE OF CORRECTION

PATENT NO. : 6,231,759 B1 Page 1 of 1
APPLICATION NO. : 09/191619
DATED : May 15, 2001
INVENTOR(S) : Takashi Sato It is certified that error appears in the above-identified patent and that said Letters Patent is hereby corrected as shown below:

Title page, Item [30] Foreign Application Priority Data,

"Dec. 24, 1996 .............. 3-55642" should be deleted.

Signed and Sealed this

Thirty-first Day of July, 2007

JON W. DUDAS
*Director of the United States Patent and Trademark Office*